(12) United States Patent
Nishioka (10) Patent No.: US 12,123,782 B2
(45) Date of Patent: Oct. 22, 2024

(54) WIRELESS SENSOR

(71) Applicant: Murata Machinery, Ltd., Kyoto (JP)

(72) Inventor: Naoki Nishioka, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 141 days.

(21) Appl. No.: 17/922,700

(22) PCT Filed: Apr. 7, 2021

(86) PCT No.: PCT/JP2021/014833
§ 371 (c)(1),
(2) Date: Nov. 1, 2022

(87) PCT Pub. No.: WO2021/225056
PCT Pub. Date: Nov. 11, 2021

(65) Prior Publication Data
US 2023/0168127 A1    Jun. 1, 2023

(30) Foreign Application Priority Data

May 7, 2020    (JP) .................................. 2020-081784

(51) Int. Cl.
*G01K 1/024*    (2021.01)
(52) U.S. Cl.
CPC ......... *G01K 1/024* (2013.01); *G01K 2215/00* (2013.01)
(58) Field of Classification Search
CPC ... G01K 1/024; G01K 2215/00; H02J 50/005; H02J 50/10; B60L 3/12; B60L 5/40;
(Continued)

(56) References Cited

U.S. PATENT DOCUMENTS 11,323,857 B2    5/2022    Hosobuchi et al.
2008/0121481 A1*  5/2008    Mitsuhashi ............ H02J 50/10
                                                    191/10
(Continued)

FOREIGN PATENT DOCUMENTS

JP           63-250798 A      10/1988
JP          2004-249887 A      9/2004
(Continued)

OTHER PUBLICATIONS

International Search Report dated Jul. 6, 2021, of corresponding International Application No. PCT/JP2021/014833 along with an English translation.

*Primary Examiner* — Omeed Alizada
(74) *Attorney, Agent, or Firm* — DLA Piper LLP (US)

(57) ABSTRACT

A temperature sensor device measures a temperature related to a transport cart system and wirelessly transmits the measured temperature. In the transport cart system a transport cart obtains electric power from the power supply line in a non-contact manner. The temperature sensor device includes an E-shaped core, a sensor body, and a temperature sensing substrate. The E-shaped core obtains electric power from the power supply line in a non-contact manner. The sensor body operates by electric power supplied by the E-shaped core and measures the temperature in the vicinity of the terminal block of the transport cart system. The temperature sensing substrate operates by electric power supplied by the E-shaped core and wirelessly transmits the temperature measured by the sensor body.

7 Claims, 8 Drawing Sheets

(58) Field of Classification Search
CPC .. B60L 5/00; B60L 53/12; H04Q 9/00; B60M 7/00; Y02T 10/70; Y02T 10/7072; Y02T 90/14; G08C 17/02
See application file for complete search history.

(56) References Cited

U.S. PATENT DOCUMENTS

2016/0223406 A1* 8/2016 Wen ........................ G01K 1/024
2020/0288285 A1* 9/2020 Hosobuchi .............. H04W 4/40

FOREIGN PATENT DOCUMENTS

| | | |
|---|---|---|
| JP | 2005-346442 A | 12/2005 |
| JP | 2019-124515 A | 7/2019 |
| WO | 2019/073928 | 4/2019 |

* cited by examiner

FIG. 8

WIRELESS SENSOR

TECHNICAL FIELD

This disclosure relates to a wireless sensor that acquires a state value in a mobility system.

BACKGROUND

Conventionally, for example, in transport cart systems, a configuration in which a sensor device including a temperature sensor is arranged is known. The sensor is placed in relation to a joint portion of a power supply line for feeding electric power to a transport cart traveling along a rail. WO 2019/073928 discloses the transport cart system having this type of configuration.

The transport cart system in WO 2019/073928 is configured so that temperature sensors detect the temperature of a plurality of power supply lines (for example, four power supply lines) electrically connected to a terminal block, and a sensing substrate wirelessly transmits acquired temperature data.

To operate the temperature sensors and the sensing substrate disclosed in WO 2019/073928, it is necessary to supply electric power. For this reason, it is necessary to perform wiring work for the electric supply cables, for example, which may cause a long time shutdown of the transport cart system. In semiconductor manufacturing plants and the like, shutting down of the transport cart system should be avoided. Therefore, it has been difficult to retrofit temperature sensors to an existing system.

It could therefore be helpful to provide a wireless sensor that can easily obtain electric power source and be easily retrofitted to an existing mobility system.

SUMMARY

I thus provide a wireless sensor that measures a state value related to a mobility system in which a moving body obtains electric power from the power supply line in a non-contact manner, and wirelessly transmits the measured state value. The wireless sensor includes a non-contact power receiving unit, a measurement unit, and a wireless transmission unit. The non-contact power receiving unit obtains electric power from the power supply line in a non-contact manner. The measurement unit operates by electric power supplied from the non-contact power receiving unit and measures the state value at a to-be-measured part of the mobility system. The wireless transmission unit operates by electric power supplied from the non-contact power receiving unit and wirelessly transmits the state value measured by the measurement unit. The non-contact power receiving unit is an E-shaped core with one side open. A position of the power supply line is fixed with respect to the E-shaped core.

Thus, the wireless sensor can obtain electric power in a non-contact manner from the power supply line that is preinstalled in the mobility system. Therefore, the wireless sensor can be easily retrofitted to the to-be-measured part without the need for a special power supply and the like. The state value measurement function can be easily added to the existing mobility system. Furthermore, sufficient electric power can be easily obtained. In addition, the power supply line can be easily attached to the non-contact power receiving unit.

The wireless sensor preferably measures a temperature as the state value.

Thus, the temperature of the to-be-measured part can be monitored.

The wireless sensor preferably measures a voltage of the power supply line as the state value in addition to the temperature.

Thus, the voltage on the power supply line can be monitored.

In the wireless sensor described above, the to-be-measured part is preferably a connection part between the power supply line and a terminal block to which the power supply line is electrically connected, or a part in the vicinity of the connection part.

Thus, it can monitor the temperature of a position where a high temperature is likely to occur due to poor electrical continuity in the connection part as a temperature monitoring target.

The wireless sensor is preferably configured as follows. The terminal block is arranged inside a casing made of metal. The wireless transmission unit is arranged outside of the casing.

Thus, an environment suitable for wireless communications between the wireless transmission unit and the outside can be realized.

The wireless sensor is preferably configured as follows. The wireless sensor includes a mounting unit that fixes a position of the non-contact power receiving unit. The mounting unit defines a relative position of the power supply line and the E-shaped core.

Thus, the position of the power supply line can be fixed and electric power can be obtained stably.

I also provide a mobility system including the wireless sensor, a plurality of moving bodies, and a management device. The plurality of moving bodies obtain electrical power from the power supply line in a non-contact manner. The management device collects the state value measured by the wireless sensor. The wireless sensor transmits the measured state value to the management device via wireless communications.

Thus, the management device can easily obtain the state value measured by the wireless sensor. The wireless sensor can obtain electrical power in a non-contact manner from the power supply line preinstalled in the mobility system. Therefore, there is no need to arrange new electrical wiring, and the arrangement of the electrical wiring of the mobility system can be simplified.

DESCRIPTION OF THE REFERENCE NUMERALS 2 transport cart (moving body)
31 power supply line
5 temperature sensor device (wireless sensor)
51 sensor body (measurement unit)
52 temperature sensing substrate (wireless transmission unit)
63 E-shaped core (non-contact power receiving unit)
100 transport cart system (mobility system)

DETAILED DESCRIPTION

Figure 1:
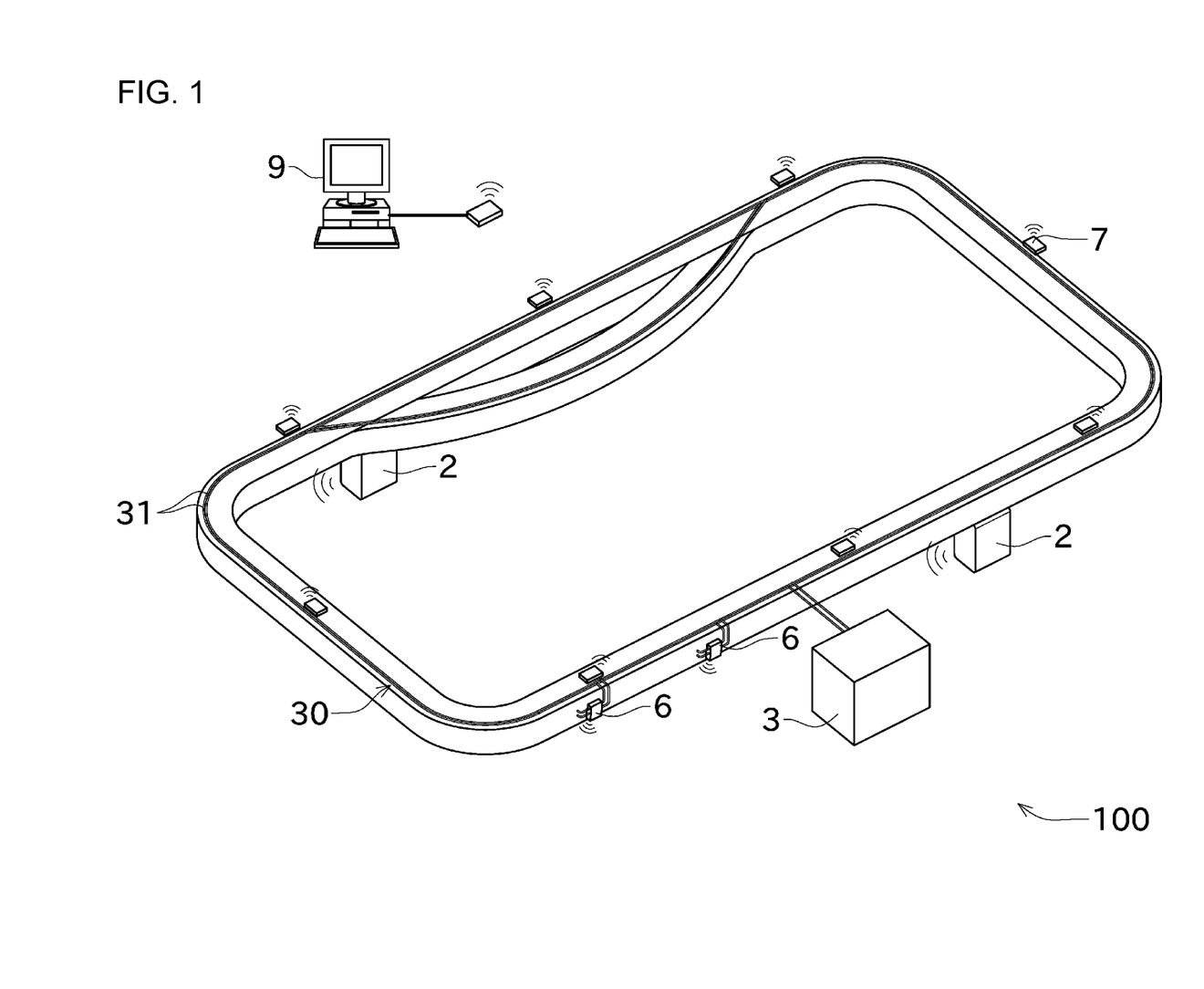
FIG. 1 is a schematic diagram showing a transport cart system of one example of my system.
Figure 2:
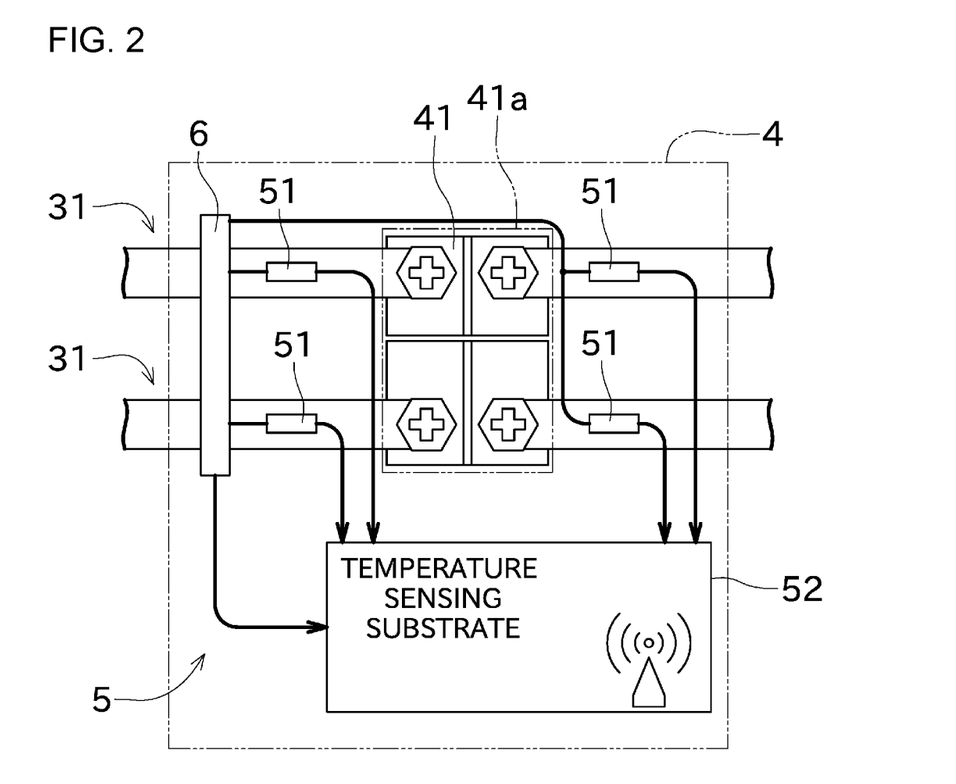
FIG. 2 is a schematic diagram showing an internal configuration of a terminal box.
Figure 3:
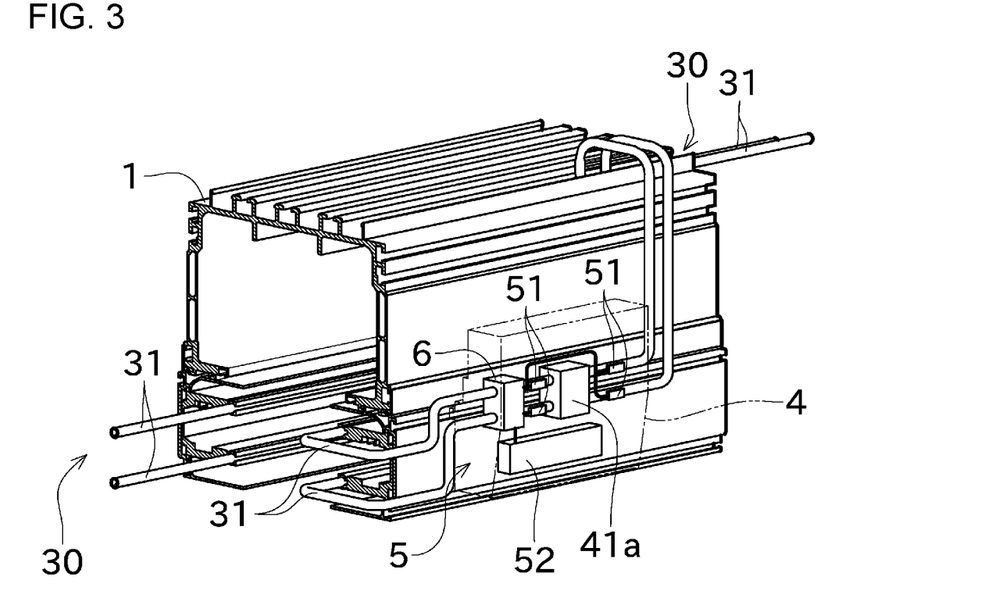
FIG. 3 is a diagram showing a portion of a rail on which the terminal box is mounted in detail.
Figure 4:
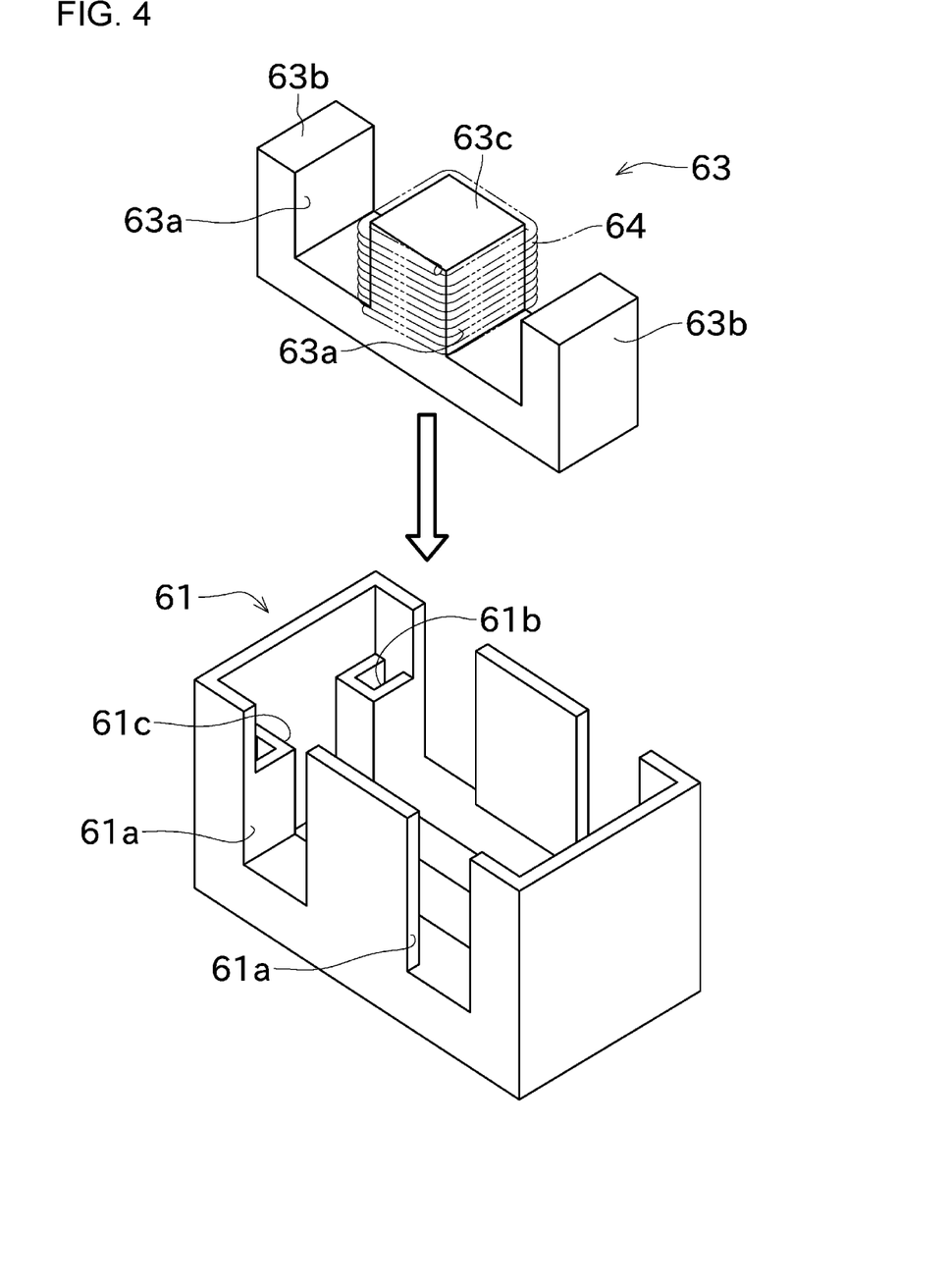
FIG. 4 is a diagram showing a configuration of a first case section and an E-shaped core.
Figure 5:
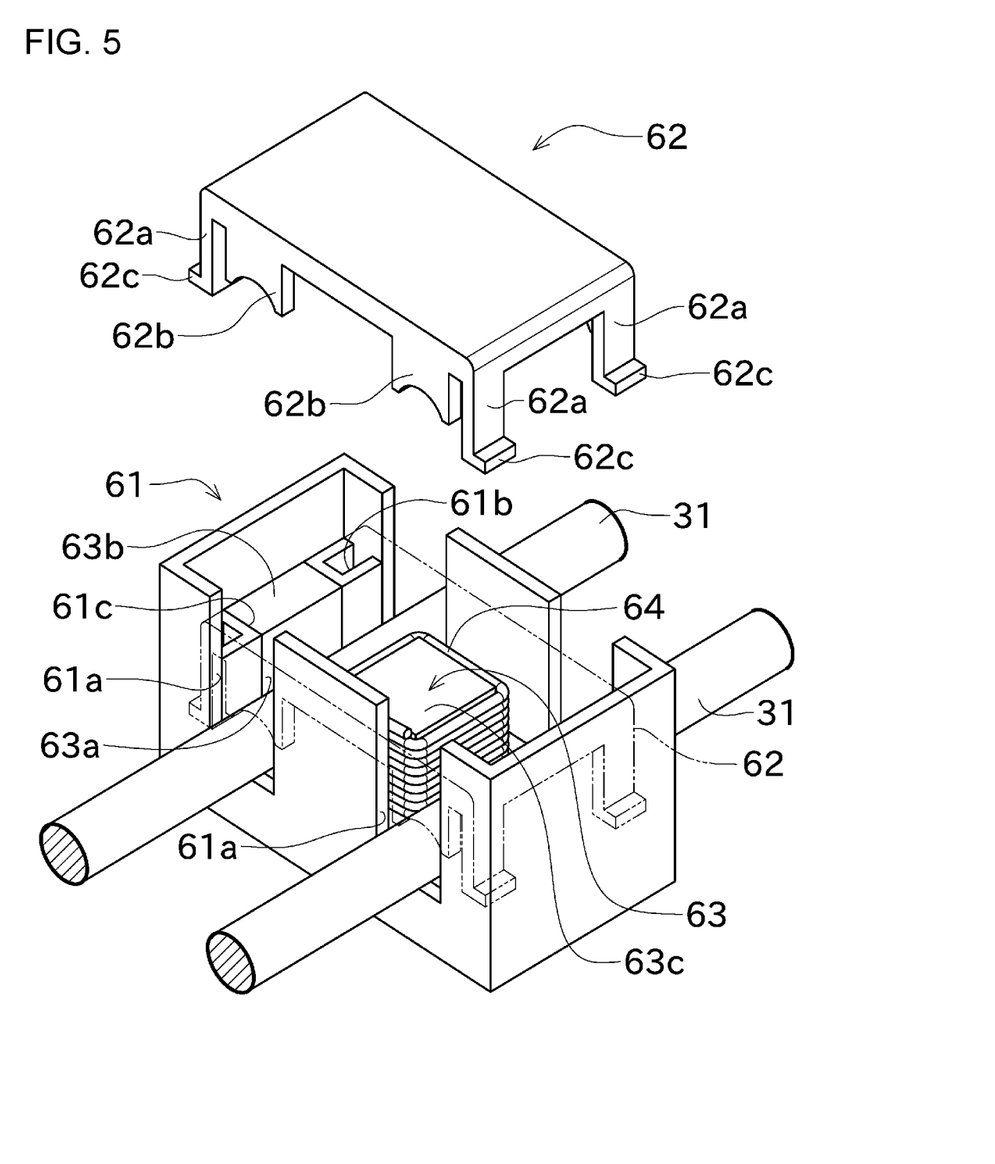
FIG. 5 is an exploded view showing a configuration of a device power supply unit.

Next, an example of my systems will be described with reference to drawings. FIG. 1 is a schematic diagram showing a transport cart system 100. FIG. 2 is a schematic diagram showing an internal configuration of a terminal box 4. FIG. 3 is a diagram showing a portion of a rail 1 on which the terminal box 4 is mounted in detail. FIG. 4 is a diagram showing a configuration of a first case part 61 and an E-shaped core 63. FIG. 5 is an exploded view showing a configuration of a device power supply unit 6.

The transport cart system (mobility system) 100 shown in FIG. 1 can transport goods by transport carts 2. The transport cart 2 travels along a rail 1 installed on a ceiling side. The transport cart system 100 is used, for example, in a semiconductor manufacturing plant with multiple processing devices (not shown) or an automated warehouse with multiple stacker racks (not shown).

The rail 1 is suspended from the ceiling of the semiconductor manufacturing plant, for example. As the transport cart 2, for example, an OHT (i.e., overhead traveling vehicle) can be used. OHT is an abbreviation for Overhead Hoist Transfer.

The transport cart 2 can obtain electric power supplied from the power supply unit 3 in a non-contact manner by electromagnetic induction via a power supply path 30 laid along the rail 1. Thus, the transport cart 2 can travel along the rail 1 while receiving electric power from the power supply path 30.

The power supply path 30 has a plurality of pairs of power supply lines 31 arranged in parallel. Each power supply line 31 includes a plurality of long, thin conductor wire elements connected to each other in the longitudinal direction. The terminal box 4, shown in FIG. 2, is arranged at each of the plurality of the joint portions.

Inside the terminal box 4, as shown in FIGS. 2 and 3, a terminal block 41 and a temperature sensor device (wireless sensor) 5 of this example are arranged.

The terminal block 41 is arranged in a casing 41a, as shown in FIG. 2. The casing 41a can be made of metal, for example. The terminal block 41 is used to electrically interconnect the conducting wire elements through which the current for the electrical supply flows, in relation to the pair of the power supply lines 31.

The temperature sensor device 5 is arranged near the terminal block 41. The temperature sensor device 5 is used to detect a temperature of the power supply line 31 in the vicinity of the terminal block 41.

The temperature sensor device 5 includes a sensor body (measurement unit) 51, a temperature sensing substrate (wireless transmission unit) 52, and a device power supply unit 6.

The sensor body 51 includes, for example, a temperature sensor. The sensor body 51 detects a temperature (state value) of the power supply line 31 in the vicinity of the terminal block 41. A to-be-measured part by the temperature sensor device 5 is a part of the power supply line 31 located in the vicinity of the terminal block 41. The sensor body 51 may also be provided in the vicinity of a connection part between the power supply line 31 and the terminal block 41 to detect the temperature in the vicinity of the connection part.

The sensor body 51 may detect a voltage at the power supply line 31 in addition to the temperature of the power supply line 31 in the vicinity of the terminal block 41. In such a configuration, the temperature of the power supply line 31 near the terminal block 41 and the voltage on the power supply line 31 correspond to the state values.

In this example, as shown in FIG. 2, four conductive wire elements are provided, two each in left and right directions relative to the paper surface, extending from the terminal block 41. As shown in FIG. 2, two sensor bodies 51 are provided for every two of the conductive wire elements which are arranged two each on the left and right, and two sensor bodies 51 are provided in the form of sandwiching the electrical connection portion connected by the terminal block 41. Each of the four sensor bodies 51 detects the temperature of the part.

Each sensor body 51 outputs the temperature sensing results to the temperature sensing substrate 52 by wire. Each sensor body 51 is operated by the electric power supplied from the temperature sensing substrate 52. Each sensor body 51 is operated by the electric power supplied from the device power supply unit 6 via the temperature sensing substrate 52.

The temperature sensing substrate 52 is provided a short distance from the terminal block 41. The temperature sensing substrate 52 is located outside of the casing 41a which houses the terminal block 41. Thus, it ensures that wireless communication by the temperature sensing substrate 52 to and from external devices is not blocked by the casing 41a made of metal.

The temperature sensing substrate 52 is electrically connected to the device power supply unit 6 via wires or the like, and operates with the power supplied by the device power supply unit 6. The temperature sensing substrate 52 transmits the detection results supplied by each of the sensor bodies 51 to a management device 9 which will be described later.

In addition to the sensor body 51, an outside temperature sensor may be provided at some distance from the terminal block 41 (for example, outside the casing 41a). An outside temperature detected by the outside temperature sensor may be separately transmitted to the management device 9 described below. Alternatively, a differential temperature between the temperature of the power supply line 31 near the terminal block 41 detected by the sensor body 51 and the outside temperature detected by the outside temperature sensor may be transmitted to the management device 9 described below. In this configuration, the management device 9 determines the occurrence of an abnormality based on the differential temperature. The outside temperature sensor is operated by the electric power supplied from the device power supply unit 6 via the temperature sensing substrate 52.

Figure 6:
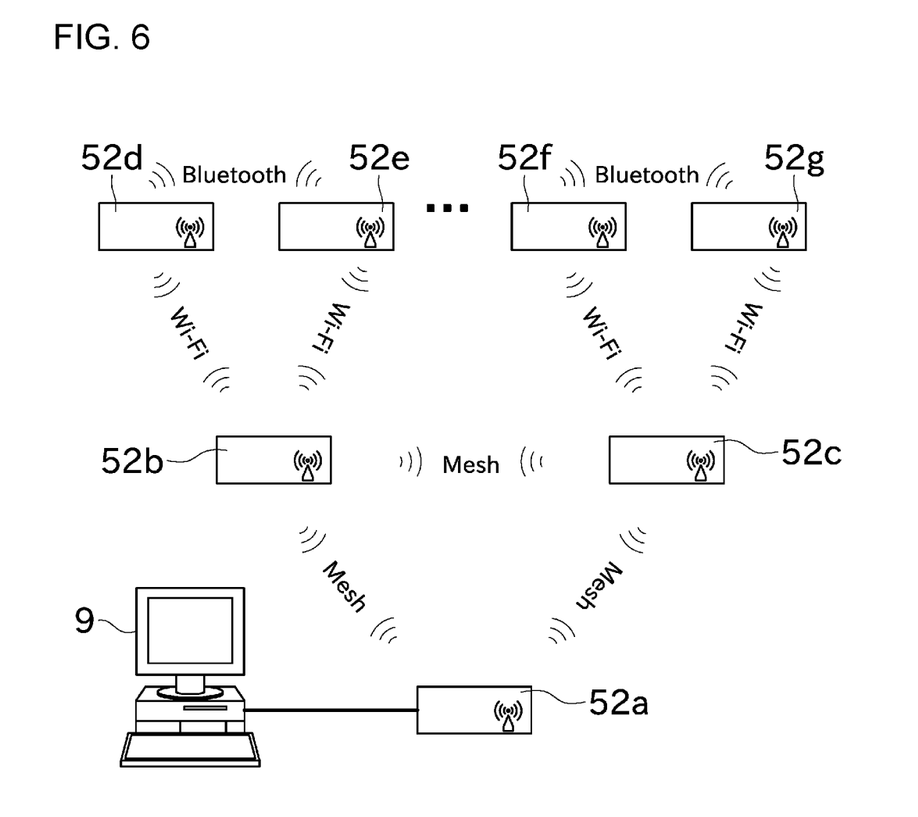
FIG. 6 is a schematic diagram showing communications among temperature sensing substrates and a management device.

Next, the communications between multiple temperature sensing substrates 52 and between temperature sensing substrates 52 and the management device 9 in this example of the transport cart system 100 will be briefly explained with reference to FIG. 6 and the like. FIG. 6 is a schematic diagram showing the communications among the temperature sensing substrates 52 and the management device 9. The temperature sensing substrates 52a-52g shown in FIG. 6 are examples of the temperature sensing substrates 52. Hereafter, when these temperature sensing substrates 52a-52g are not specifically distinguished, they will simply be referred to as temperature sensing substrates 52.

Each of the plurality of the temperature sensing substrates 52 in this example has a relay function and is provided at appropriate intervals to each other. The temperature sensing substrates 52 are used as relays for the other temperature sensing substrates 52 to achieve multi-hop communication that can transmit data over a longer distance.

Specifically, the temperature sensing substrate 52 is configured to allow wireless communications with another temperature sensing substrate 52. The temperature sensing substrate 52 acquires the detection results of the temperature from the other temperature sensing substrates 52 through wireless communications with the other temperature sensing substrates 52. The temperature sensing substrate 52 further transmits the acquired detection results of the other temperature sensing substrates 52 and its own detection results to yet another temperature sensing substrate 52 or the management device 9.

When the temperature sensing substrate 52 transmits the acquired detection results of the other temperature sensing substrates 52 and its own detection results to yet another temperature sensing substrate 52, it functions as a relay equipment in the wireless communications between other temperature sensing substrates 52. When the temperature sensing substrate 52 transmits the acquired detection results of the other temperature sensing substrates 52 and its own detection results to the management device 9, it functions as a relay equipment in the wireless communications between the other temperature sensing substrates 52 and the management device 9.

As shown in FIG. 6, each of the temperature sensing substrates 52a-52g performs wireless communication with other temperature sensing substrates 52 in a different manner with the other based on their location or the like. The temperature sensing substrates 52a, 52b, and 52c constitute a mesh network using Wi-Fi and the like, and perform so-called mesh communications with each other. In particular, between the temperature sensing substrate 52a connected to the management device 9 by wire and several temperature sensing substrates 52 located in its vicinity (the temperature sensing substrates 52b and 52c in FIG. 6), such mesh communications are preferably performed.

The temperature sensing substrate 52b performs wireless communications respectively with the temperature sensing substrates 52d and 52e via Wi-Fi. The temperature sensing substrate 52c performs wireless communications respectively with the temperature sensing substrates 52f and 52g via Wi-Fi. In this way, each of temperature sensing substrates 52a, 52b, and 52c that constitute the above-mentioned mesh network performs so-called star type wireless communications with a plurality of temperature sensing substrates 52 located in its neighborhoods, so-called star type wireless communications not constituting a mesh network.

The temperature sensing substrate 52d performs wireless communications with the temperature sensing substrate 52e by BLUETOOTH (registered trademark). The temperature sensing substrate 52f performs wireless communications with the temperature sensing substrate 52g by BLUETOOTH. In this way, wireless communications by BLUETOOTH are performed between the temperature sensing substrates 52a-52c that constitute the above-mentioned mesh network and the temperature sensing substrates 52d-52g that perform so-called star-type wireless communication.

In communication systems where multiple communication devices communicate wirelessly with each other, there is a risk of packet collisions during transmission. In Wi-Fi communications, packet collisions can be avoided through mechanisms such as the CSMA/CA method. However, in wireless communications based on BLUETOOTH, there is no such mechanism, and each communication device sends packets based on its own judgment, which may result in packet collisions.

Therefore, the temperature sensing substrates 52 in this example are configured to be able to communicate wirelessly with other temperature sensing substrates 52 through Wi-Fi and also configured to be able to communicate with other temperature sensing substrates 52 via BLUETOOTH. When the temperature sensing substrate 52 receives a packet containing the detection result from another temperature sensing substrate 52 via BLUETOOTH communication, the timing at which the temperature sensing substrate 52 itself sends the packet via Wi-Fi communication is adjusted based on the time at which the packet containing the detection result was received. In this situation, the temperature sensing substrate 52 includes the aforementioned detection result received from the other temperature sensing substrates 52 in the packet to be transmitted via the Wi-Fi communication.

Thus, in the example shown in FIG. 6, while suppressing packet collisions, the temperature sensing substrate 52e, instead of the temperature detection substrate 52d, can transmit the detection results which should be sent by the temperature sensing substrate 52d to the temperature sensing substrate 52b that constitutes the aforementioned mesh network.

The management device 9 is configured as, for example, a personal computer, a server device, a tablet terminal, a smartphone and the like. The management device 9 is wired/wirelessly connected to the temperature sensing substrate 52a and acquires the detection results of the temperature sensor devices 5 based on communication with the temperature sensing substrate 52a. In this way, the management device 9 collects the detection results obtained from the temperature sensor devices 5 by communications with the temperature sensing substrate 52a. Based on the acquired data, the management device 9 monitors whether an abnormality (for example, a temperature abnormality in the vicinity of the terminal block 41) of the transport cart system 100 is occurring.

As described above, by wireless communications between the temperature sensing substrates 52 or the like, the detection results detected by the sensor body 51 are immediately shared with other temperature sensing substrates 52 and collected by the management device 9. Thus, the management device 9 can monitor in real time the temperature in the vicinity of the terminal block 41, which tends to become hot due to faulty poor electrical connection in the terminal block 41.

As shown in FIG. 5, the device power supply unit 6 mainly includes a first case part 61, a second case part 62, and an E-shaped core (non-contact power receiving unit) 63. The first case part 61 and the second case part 62 constitute a mounting unit of this example.

The first case part 61 is formed, for example, from synthetic resin. The first case part 61 is formed in a shape of a hollow box with one side open. The second case part 62 is attached to the first case part 61 from the open side.

When viewed in the direction in which the second case part 62 is attached to the first case part 61, the first case part 61 is formed in a rectangular shape. When viewed in the axial direction of the power supply line 31, the first case part 61 is formed in an E-shape.

The first case part 61 is formed with notches 61a, case fixing portions 61b, and an E-shaped core fitting portion 61c.

The notch 61a is formed by a side wall portion in the first case part 61 being notched to open one side (upper side). The open side of the notch 61a is the same as the open side in the first case part 61. The notch 61a is formed to penetrate the first case part 61 (the side wall portion) in the axial direction of the power supply line 31. Thus, the power supply line 31 can pass through the notch 61a. The width dimension in the notch 61a is approximately equal to or slightly larger than the diameter dimension of the power supply line 31. Thus, the movement of the power supply line 31 passing through the notch 61a in the direction of the width of the notch 61a is restricted and its position is defined.

The two notches 61a are formed side by side at a predetermined distance. Each of the two power supply lines 31 can be fitted into the corresponding notch 61a. Each of the notches 61a can accommodate a portion of the power supply line 31, as shown in FIG. 5.

The case fixing portions 61b are provided in each of the four corners of the first case part 61. The case fixing portion 61b is formed in a square cylindrical shape into which a mounting piece 62a described below can be inserted. For example, a hooking portion (not shown) into which a claw portion 62c of the inserted mounting piece 62a can be hooked is provided inside the case fixing portion 61b. Thus, the mounting piece 62a can be fixed so that it cannot be pulled out of the case fixing portion 61b.

The E-shaped core fitting portion 61c is arranged inside the first case part 61 and is formed in a form of an elongated groove. The longitudinal direction of this groove is perpendicular to the longitudinal direction of the power supply line 31. The longitudinal direction of the groove coincides with the direction in which the two notches 61a are lined up. The E-shaped core fitting portion 61c accommodates a part of the E-shaped core 63. As shown in FIG. 5, when the E-shaped core 63 is fitted into the E-shaped core fitting portion 61c, the position of the E-shaped core 63 is fixed.

The second case part 62 is formed, for example, from synthetic resin. The second case part 62 engages with the first case part 61 and functions as a cover to close the open portion of the E-shaped first case part 61. Thus, as shown in FIG. 5, passages into which the power supply lines 31 can be inserted are formed between the second case part 62 and the first case part 61.

The second case part 62 is generally formed in a plate shape, as shown in FIG. 5. The second case part 62 is formed in a rectangular shape slightly smaller than the first case part 61 when viewed in the direction in which the second case part 62 faces the first case part 61.

The second case part 62 includes four mounting pieces 62a and four pushing pieces 62b.

The mounting piece 62a is used to fix the second case part 62 to the first case part 61. The mounting piece 62a is formed at each of the four corners of the second case part 62 and protrudes toward the first case part 61. The mounting pieces 62a are provided two at each of the two ends of the second case part 62 in the direction in which the two power supply lines 31 are lined up.

A small claw portion 62c is provided at the tip of the mounting piece 62a. The claw portion 62c protrudes away from the center of the second case part 62 in the direction in which the two power supply lines 31 are lined up. The claw portion 62c is formed so that a portion of the tip of the mounting piece 62a is bent into an L-shaped shape.

As shown in FIG. 5, when attaching the second case part 62 to the first case part 61, the four mounting pieces 62a are inserted into the case fixing portions 61b. The claw portions 62c of the mounting pieces 62a are inserted into the case fixing portions 61b and hooked in the hooking portion (not shown), thereby fixing the second case part 62 to the first case part 61.

The pushing piece 62b is used to fix the position of the power supply line 31 that is passed through the notch 61a. As shown in FIG. 5, the pushing piece 62b is provided at a position corresponding to the notch 61a.

Two pushing pieces 62b are respectively provided on both sides of the second case part 62 in the axial direction of the power supply line 31. One power supply line 31 is held down by the two pushing pieces 62b located at two different points in the axial direction of the power supply line 31. Furthermore, since the width of the notch 61a is configured as described above, the movement of the power supply line 31 passing through the notch 61a in the width direction of the notch 61a is restricted. The second case part 62 is attached to the first case part 61 with the power supply line 31 being passed through the notch 61a so that the position of the power supply line 31 can be fixed in relation to the first case part 61 and the second case part 62 (and thus the E-shaped core 63).

An arc-shaped recess is formed at the tip of the pushing piece 62b. When viewed in the axial direction of the power supply line 31, the arc-shaped portion is formed to be concave in the direction away from the first case part 61. In the following description, the inner surface of the arc-shaped recess is referred to as arc surface.

When the second case part 62 is fitted into the first case part 61, the arc surface of the pushing piece 62b contacts a part of the outer circumference of the power supply line 31, which is located in the notch 61a of the first case part 61. Thus, the movement of the power supply lines 31 in the direction in which the two power supply lines 31 are lined up can be restricted.

As described above, the position of the E-shaped core 63 is fixed by the first case part 61. On the other hand, the position of the power supply line 31 is fixed by such as the pushing piece 62b of the second case part 62. The combination of the first case part 61 and the second case part 62 enables relative positioning of the power supply line 31 and the E-shaped core 63. As a result, stable induction power can be obtained.

The E-shaped core 63 is formed from a magnetic material such as ferrite or the like, for example. As shown in FIGS. 4 and 5, the E-shaped core 63 is formed in an E-shape when viewed in the axial direction of the power supply line 31. In the E-shaped core 63, two core notches 63a are formed side by side at a suitable distance in the direction in which the two power supply lines 31 are lined up. The two core notches 63a are formed to open the same side (one side) of the E-shaped core 63. The E-shaped core 63 is fitted inside the first case part 61 so that the core notches 63a correspond to the notches 61a.

As shown in FIG. 4, the E-shaped core 63 includes two outer protrusions 63b and a central protrusion 63c.

One outer protrusion 63b is provided on each of two outer sides of the E-shaped core 63 in the longitudinal direction.

The central protrusion 63c is provided at a center position of the E-shaped core 63. The central protrusion 63c is positioned between the two outer protrusions 63b. A winding 64 made of copper wire, for example, is disposed on the outer surface of the central protrusion 63c. This winding 64 corresponds to a secondary coil.

The part of the power supply lines 31 arranged in each of the core notches 63a of the E-shaped core 63 corresponds to a primary coil. When an alternating current is applied to the power supply line 31, an induction current proportional to the magnetic flux generated flows through the winding 64. Through this electromagnetic induction, power can be obtained from the power supply line 31 in a non-contact manner.

As described above, the temperature sensor device 5 in this example includes the device power supply unit 6 so it can be easily arranged without requiring any wiring work for the electric supply cable and the like. It can be easily applied to the existing terminal block 41 by arranging the first case part 61 so that two power supply lines 31 are respectively located in the notches 61a of the first case part 61 and fitting the second case part 62 to the first case part 61.

Figure 7:
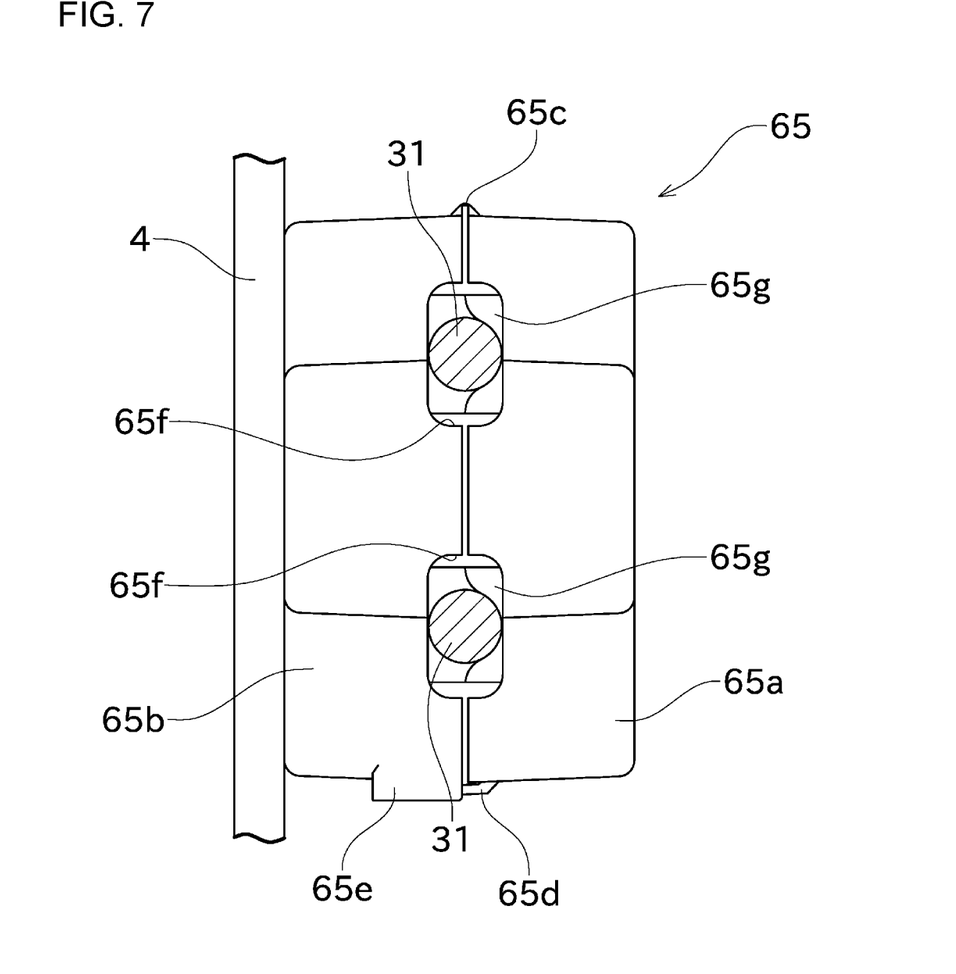
FIG. 7 is an overview diagram showing another configuration of the device power supply unit.
Figure 8:
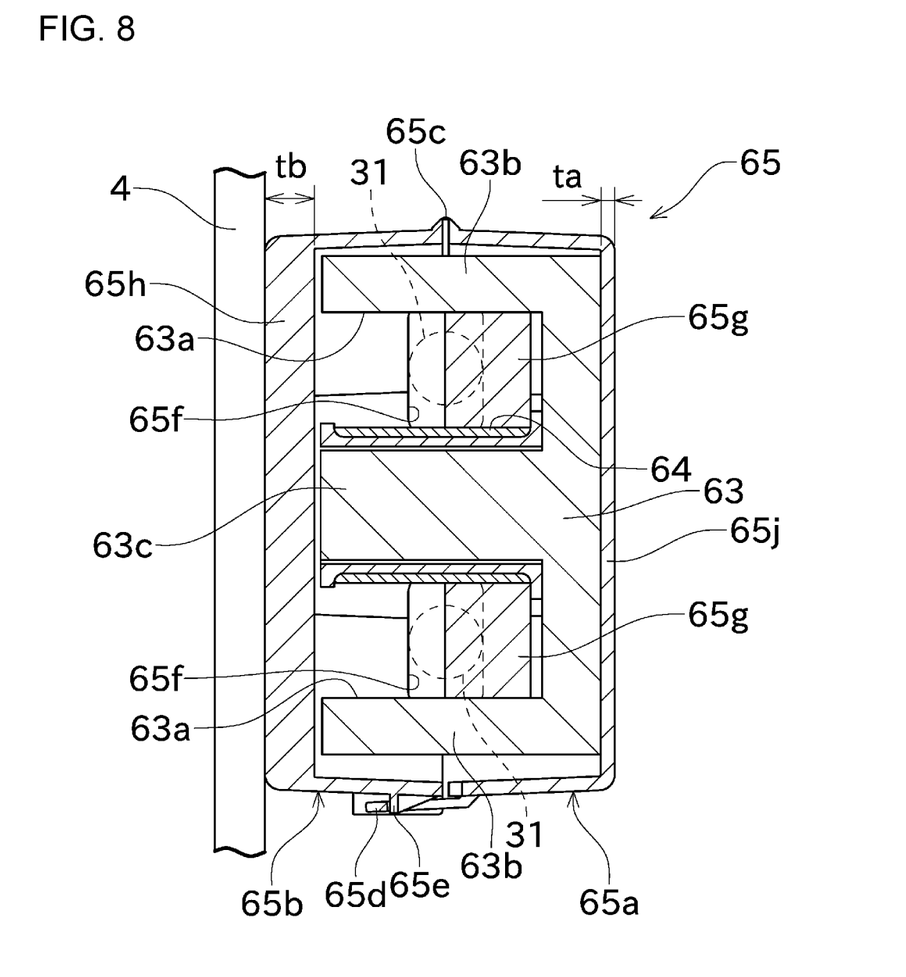
FIG. 8 is a cross-sectional view showing above-described another configuration of the device power supply unit.

FIG. 7 is an overview diagram showing another configuration of the device power supply unit 6, and FIG. 8 is its cross-sectional view. Another example of the configuration of the device power supply unit 6 will be described with reference to FIGS. 7 and 8. In the following description, parts that are common to the example described using FIGS. 5 and 6 are given the same corresponding reference numerals on the drawings, and descriptions thereof may be omitted.

The device power supply unit 6 in this configuration example includes a case section 65. The case section 65 includes a first case part 65a and a second case part 65b. The first case part 65a and the second case part 65b are connected at a hinge part 65c and can be opened and closed by rotating each other with the hinge part 65c as a fulcrum. The opposite end of the first case part 65a from the hinge part 65c is provided with an engagement claw portion 65d, and the opposite end of the second case part 65b from the hinge part 65c is provided with a to-be-engaged portion 65e. It is configured such that the first case part 65a and the second case part 65b are fitted to each other by the engagement claw portion 65d engaging with the to-be-engaged portion 65e, and rotation around the hinge part 65c becomes unable.

When the first case part 65a and the second case part 65b are fitted to each other, a pair of window portions 65f is formed in the case section 65. The core notch 63a of the E-shaped core 63 is filled with a filler material 65g made of an electrical insulator such as urethane resin. As shown in FIG. 7, with the power supply line 31 inserted at a position corresponding to the window portion 65f, when the first case part 65a and the second case part 65b are fitted into each other, the filler material 65g is elastically deformed and the position of the power supply line 31 is restricted by being held between the window portion 65f and the filler material 65g. In FIG. 8, the power supply line 31, and the window portion 65f on the first case part 65a side are shown as dashed lines, and the shape of the filler material 65g before it is elastically deformed (no force is applied) is shown as an example.

As shown in FIG. 7, a pair of power supply lines 31 is sandwiched between the window portion 65f and the filler material 65g so that the case section 65 is held with respect to the power supply lines 31. Therefore, the case section 65 is not fixed to the rail 1, the terminal box 4 or the like. In FIGS. 7 and 8, the case section 65 is attached to the pair of power supply lines 31 so that the second case part 65b of the case section 65 is on the terminal box 4 side, but the case section 65 may be arranged so that the first case part 65a is on the terminal box 4 side.

As shown in FIG. 8, the thickness dimension tb of a bottom 65h in the second case part 65b is larger than the thickness dimension to of a bottom 65j in the first case part 65a. As shown in FIG. 8, even when the case section 65 (the second case part 65b) and the terminal box 4 are closest to each other, the open end of the E-shaped core 63 (the protrusion side of the outer protrusion 63b and the central protrusion 63c) is located at a distance from the terminal box 4 at least corresponding to the thickness dimension tb of the bottom 65h. This thickness dimension tb is sufficient to prevent the magnetic field generated by the E-shaped core 63 from generating eddy currents in the members constituting the terminal box 4.

The terminal box 4 is made of a conductor, for example, an aluminum alloy. Therefore, if the open end of the E-shaped core 63 is provided close to the terminal box 4, the magnetic field generated by the E-shaped core 63 may generate eddy currents in the conductive plate material that constitutes the terminal box 4, causing power loss and lowering the power supply efficiency. In this configuration example, the thickness dimension tb of the bottom 65h of the second case part 65b is sufficiently large to maintain a sufficient distance between the open end of the E-shaped core 63 housed in the case section 65 and the terminal box 4. Thus, it can prevent the magnetic field generated by the E-shaped core 63 from generating eddy currents in the conductive plate material that constitutes the terminal box 4, thereby preventing a decrease in the power supply efficiency of the device power supply unit 6.

On the other hand, the thickness dimension to of the bottom 65j of the first case part 65a is smaller than the thickness dimension tb of the bottom 65h of the second case part 65b, but the magnetic field generated from the base side of the E-shaped core 63 (opposite the open end) toward the outside is sufficiently smaller than the magnetic field generated from the open end toward the outside so the magnetic field generated from the base side of the E-shaped core 63 has little effect on the surrounding conductive plates and the like. Therefore, in the configuration in which the case section 65 is provided with respect to the power supply line 31 such that the first case part 65a is positioned on the terminal box 4 side, even if in the state that the case section 65 (the first case part 65a) is closest to the terminal box 4, the magnetic field generated by the E-shaped core 63 also does not generate eddy currents in the components of the terminal box 4, preventing the reduction of the power supply efficiency of the device power supply unit 6.

As described above, according to this configuration example, even if either the first case part 65a or the second case part 65b is located on the terminal box 4 side when the case section 65 is provided with respect to the power supply line 31, it is possible to suppress the magnetic field generated by the E-shaped core 63 generates eddy currents in the components constituting the terminal box 4, thereby preventing the reduction of the power supply efficiency of the device power supply unit 6. Therefore, when an operator attaches the case section 65 with respect to the power supply line 31, either the first case part 65a or the second case part 65b can be provided on the side of the terminal box 4 so he/she does not need to pay attention to the direction of the case section 65 and the installation efficiency can be improved.

Although not shown in FIGS. 7 and 8, when the case section 65 is provided to the power supply line 31, a mounting member for providing the terminal block 41 to the rail 1 is located on the opposite side of the components constituting the terminal box 4 with respect to the case section 65. The mounting member is made of a conductive plate material such as iron or the like, for example. Although iron material has a higher volume resistivity than aluminum material and is less likely to generate eddy currents when a magnetic field influences, eddy currents may also be generated due to the influence of the magnetic field generated by the E-shaped core 63. However, as described above, the case section 65 of this configuration example is configured to suppress the generation of eddy currents no matter even when the conductive plate material approaches the first case part 65*a* or second case part 65*b* so that it is possible to suppress the generation of eddy currents in any of components constituting the terminal box 4 and the mounting members, and it prevents a decrease in the power supply efficiency of the device power supply unit 6.

As described above, the temperature sensor device 5 in this example measures the temperature related to the transport cart system 100 in which the transport cart 2 obtains electric power from the power supply line 31 in a non-contact manner, and wirelessly transmits the measured temperature. The temperature sensor device 5 includes the E-shaped core 63, the sensor body 51, and the temperature sensing substrate 52. The E-shaped core 63 obtains electric power from the power supply line 31 in a non-contact manner. The sensor body 51 operates by electric power supplied from the E-shaped core 63 and measures the temperature at a to-be-measured part of the transport cart system 100. The temperature sensing substrate 52 operates by electric power supplied from the E-shaped core 63 and wirelessly transmits the temperature measured by the sensor body 51.

Thus, the temperature sensor device 5 can obtain electric power in a non-contact manner from the power supply line 31 which is preinstalled in the transport cart system 100. Therefore, the temperature sensor device 5 can be easily retrofitted to the to-be-measured part without the need for a special power supply and the like. The temperature measurement function can be easily added to the existing transport cart system 100.

The temperature sensor device 5 measures temperature as the state value.

Thus, the temperature of the to-be-measured part can be monitored.

The temperature sensor device 5 may measure the voltage of the power supply line 31 as the state value in addition to the temperature.

In this example, in addition to the temperature, the voltage on the power supply line 31 can be monitored.

In the temperature sensor device 5 of this example, the to-be-measured part is the connection part between the power supply line 31 and the terminal block 41 to which the power supply line 31 is electrically connected, or the part in the vicinity of the connection part.

Thus, it can monitor the temperature of the position where the high temperature is likely to occur due to poor electrical continuity in the connection part as the temperature monitoring target.

In the temperature sensor device 5 of this example, the terminal block 41 is arranged inside the casing 41*a* made of metal. The temperature sensing substrate 52 is arranged outside of the casing 41*a*.

Thus, an environment suitable for wireless communications between the temperature sensing substrate 52 and the outside can be realized.

In the temperature sensor device 5 of this example, the E-shaped core 63 is open on one side.

Thus, sufficient electric power can be easily obtained. In addition, the power supply line 31 can be easily attached to the E-shaped core 63.

The temperature sensor device 5 of this example also includes the first case part 61 and the second case part 62 that fix the position of the E-shaped core 63. The first case part 61 and the second case part 62 define the relative position of the power supply line 31 and the E-shaped core 63.

Thus, the position of the power supply line 31 can be fixed and electric power can be obtained in a stable manner.

Although a preferred example of my systems has been described above, the configurations described above may be modified as follows, for example.

Instead of the temperature sensor device 5, the wireless sensor can be, for example, a humidity sensor to detect humidity, an infrared sensor to detect the presence, absence or the like of an object, a mechanical sensor to detect a state by a mechanical mechanism, a current sensor for overcurrent protection, a flow sensor to detect a flow rate of liquid or gas or the like.

Each sensor body 51 may transmit the detection results to the management device 9 via wireless communications with a slave device 7, not via the temperature sensing substrate 52.

The configuration of the first case part 61 and the second case part 62 as the mounting unit is not limited to the above. As long as the relative position of the E-shaped core 63 and the power supply line 31 can be fixed, the mounting unit may be changed to other shapes.

An I-shaped core or an E-shaped core may be built into the second case part 62.

The invention claimed is:

1. A wireless sensor that a) measures a state value related to a mobility system in which a moving body obtains electric power from a power supply line in a non-contact manner, and b) wirelessly transmits the measured state value, the wireless sensor comprising:

a non-contact power receiving unit that obtains electric power from the power supply line in a non-contact manner, and is housed in a case that has at least a portion designed and configured to minimize the production of eddy currents between the non-contact power receiving unit and adjacent materials;

a measurement unit that operates by electric power supplied from the non-contact power receiving unit and measures the state value at a to-be-measured part of the mobility system; and a wireless transmission unit that operates by electric power supplied from the non-contact power receiving unit and wirelessly transmits the state value measured by the measurement unit, wherein the non-contact power receiving unit is an E-shaped core with one side open, and a position of the power supply line is fixed with respect to the E-shaped core.

2. The wireless sensor according to claim 1, wherein a temperature is measured as the state value.

3. The wireless sensor according to claim 2, wherein in addition to the temperature, a voltage of the power supply line is measured as the state value.

4. The wireless sensor according to claim 2, wherein the to-be-measured part is a connection part between the power supply line and a terminal block to which the power supply line is electrically connected, or a part in the vicinity of the connection part.

5. The wireless sensor according to claim 4, wherein
the terminal block is arranged inside a casing made of metal, and
the wireless transmission unit is arranged outside of the casing.

6. The wireless sensor according to claim 1, comprising:
a mounting unit that fixes a position of the non-contact power receiving unit, wherein
the mounting unit defines a relative position of the power supply line and the E-shaped core.

7. A mobility system comprising:
the wireless sensor according to claim 1;
a plurality of moving bodies that obtain electric power from the power supply line in a non-contact manner; and
a management device that collects the state value measured by the wireless sensor, wherein
the wireless sensor transmits the measured state value to the management device via wireless communications.

* * * * *